United States Patent [19]

Muys et al.

[11] Patent Number: 5,312,681
[45] Date of Patent: May 17, 1994

[54] SHEET OR WEB MATERIAL HAVING ANTISTATIC PROPERTIES

[75] Inventors: Bavo Muys, Mortsel, Belgium; Friedrich Jonas, Aachen, Fed. Rep. of Germany

[73] Assignee: AGFA-Gevaert, N.V., Mortsel, Belgium

[21] Appl. No.: 683

[22] Filed: Jan. 5, 1993

[30] Foreign Application Priority Data

Jan. 28, 1992 [EP] European Pat. Off. ......... 92200230.8

[51] Int. Cl.$^5$ ................................. B32B 5/16
[52] U.S. Cl. .................................. 428/323; 428/327; 428/411.1; 428/480; 428/537.5; 430/523; 430/527
[58] Field of Search ............ 428/537.5, 201, 204, 428/206, 327, 480, 483, 323, 411.1; 430/62, 64, 75, 523, 527, 529; 524/910, 911; 526/256

[56] References Cited

U.S. PATENT DOCUMENTS

| | | | |
|---|---|---|---|
| 3,525,621 | 8/1970 | Miller | 430/529 |
| 3,557,068 | 1/1971 | Huber | 526/256 |
| 4,147,550 | 4/1979 | Campbell et al. | 430/529 |
| 4,301,240 | 11/1981 | Brück et al. | 430/537 |
| 4,689,359 | 8/1987 | Ponticello et al. | 524/23 |
| 4,728,689 | 3/1988 | Saito | 524/507 |
| 5,006,451 | 4/1991 | Anderson et al. | 430/527 |
| 5,063,128 | 11/1991 | Yuh et al. | 430/63 |
| 5,093,033 | 3/1992 | Feldhues et al. | 252/500 |
| 5,171,632 | 12/1992 | Heeger et al. | 428/364 |
| 5,202,223 | 4/1993 | Shibata et al. | 430/529 |

*Primary Examiner*—Patrick J. Ryan
*Assistant Examiner*—Marie R. Macholl
*Attorney, Agent, or Firm*—Breiner & Breiner

[57] ABSTRACT

A sheet or web material comprising a hydrophobic resin support or paper support coated with at least one hydrophobic resin layer wherein said resin support or resin layer is coated with a transparent antistatic layer containing as an essential component a polythiophene with conjugated polymer backbone in the presence of a polymeric polyanion compound, characterized in that said antistatic layer is coated with an overlying adhering barrier layer applied from an aqueous polymer dispersion wherein the dispersed polymer has hydrophilic functionality sufficient to render said overlying layer adherent to a thereon coated hydrophilic colloid-containing layer.

10 Claims, No Drawings

SHEET OR WEB MATERIAL HAVING ANTISTATIC PROPERTIES

DESCRIPTION

1. Field of the invention

The present invention relates to a sheet or web material having antistatic properties, and is particularly but not exclusively concerned with recording materials wherein a hydrophobic resin support carries an antistatic layer and an overlying barrier layer imparting good adherence to a hydrophilic colloid-containing layer, e.g. a light-sensitive gelatin-silver halide emulsion layer.

2. Background of the Invention

It is known that hydrophobic resin sheet and web materials of low conductivity readily become electrostatically charged by friction with dielectric materials and/or contact with electrostatically chargeable transport means, e.g. rollers. The charging occurs particularly easily in a relatively dry atmospheric environment.

Sheets and webs of hydrophobic resins, e.g. polyesters or cellulosetriacetate, are commonly used as support element of recording materials. Such materials are subjected to frictional contact with other elements during their manufacture, e.g. during coating or cutting, and during use, e.g. during the recording of information, e.g. with a step-and-repeat or movie camera or—in the case of silver halide photographic materials—during image-processing or image projection.

Especially in the reeling-up or unreeling of dry photographic film in a camera or projector high friction may occur, resulting in electrostatic charges that may attract dust or cause sparking. In unprocessed photographic silver halide emulsion materials, sparking causes developable fog and degrades the image quality.

In order to reduce electrostatic charging of photographic sheet or web materials comprising a hydrophobic resin support coated with at least one silver halide emulsion layer without impairing their transparency, it is known to incorporate ionic compounds in these materials, e.g. in the gelatin-silver halide emulsion layer(s) or other hydrophilic colloid layers. In order to avoid diffusion of ionic compounds out of said layers during the wet processing treatments of said materials, preference has been given to incorporate therein antistatic high molecular weight polymeric compounds having ionic groups, e.g. carboxylic sodium salt groups, at frequent intervals in the polymer chain [ref. Photographic Emulsion Chemistry, by G.F. Duffin,—The Focal Press—London and New York (1966)— Focal Press Ltd., p. 168].

The conductivity of an antistatic layer containing said ionic conductive polymers is moisture dependent and is lowered considerably by treatment with an acidic photographic processing liquid. e.g. an acidic photographic fixing liquid or stop bath.

Substances having electronic conductivity instead of ionic conductivity have a conductivity independent from relative humidity and changes in pH whereby they are particularly suited for use in the production of antistatic layers with permanent and reproducible conductivity.

Relatively recently, electrically-conducting conjugated polymers have been developed that have electronic conductivity. Representatives of such polymers are described in the periodical Materials & Design Vol. 11, No. 3 - June 1990, p. 142-152, and in the book "Science and Applications of Conducting Polymers" Papers from the 6th European Physical Society Industrial Workshop held in Lothus, Norway, 28-31 May 1990, Edited by W. R. Salaneck Linkoping University, D. T. Clark ICI Wilton Materials Research Centre, and E. J. Samuelson University of Trondheim, published under the Adam Hilger imprint by IOP Publishing Ltd Techno House, Redcliffe Way, Bristol BS1 6NX, England.

Many of these conductive polymers are highly coloured which makes them less suited for use in photographic materials, but some of them of the group of the polyarenemethylidenes, e.g. polythiophenes and polyisothianaphthene are not prohibitively coloured and transparent, at least when coated in thin layers.

Further for ecological reasons the coating of said layers should proceed where possible from aqueous medium by using as less as possible of organic solvents.

The production of conductive polythiophenes is described in preparation literature mentioned in the above mentioned book : "Science and Applications of Conducting Polymers", p. 92.

The production of colour neutral conducting polymers from isothionaphthene is described in J Electrochem Soc 134, (1987) 46.

The production of antistatic coatings from aqueous coating compositions being dispersions of polythiophenes in the presence of polyanions is described in published European patent application 0 440 957 and corresponding U.S. Ser. No. 647,093 (abandoned) which should be read in conjunction herewith.

In order to protect antistatic coatings against mechanical or chemical damage they are normally covered with an overcoat layer that may serve as an outermost layer.

SUMMARY OF THE INVENTION

It is an object of the present invention to provide a sheet or web material which includes a hydrophobic resin support, e.g. polyethylene terephthalate resin support or paper support coated with a hydrophobic resin layer carrying a transparent antistatic layer containing an electrically conductive polymer having electronic conductivity, e.g. a conductive polythiophene, which by a barrier layer for said polymer(s) is adhered to an adjacent hydrophilic colloid layer, e.g. gelatin-silver halide emulsion layer or gelatin-containing back coating of a photographic silver halide emulsion layer material.

It is a further object of the present invention to provide a sheet or web type photographic gelatin-silver halide emulsion layer material that through said antistatic layer and a thereon coated barrier layer obtains permanent antistatic properties, i.e. does not show a substantial change in resistivity after wet processing.

Other objects and advantages of the present invention will become clear from the further description and examples.

According to the present invention there is provided a sheet or web material comprising a hydrophobic resin support or paper support coated with at least one hydrophobic resin layer wherein said resin support or resin layer is coated with a transparent antistatic layer containing as an essential component a polythiophene with conjugated polymer backbone in the presence of a polymeric polyanion compound, characterized in that said antistatic layer is coated with an overlying adhering barrier layer applied from an aqueous polymer dispersion (polymer latex) wherein the dispersed polymer has hydrophilic functionality sufficient to render said overlying layer adherent to a thereon coated hydrophilic colloid-containing layer, e.g. gelatin-silver halide emulsion layer or gelatin-containing backing layer.

DETAILED DESCRIPTION OF THE INVENTION

Preferred polythiophenes for use according to the present invention are made up of structural units corresponding to the following general formula (I)

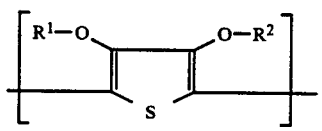

in which:
each of $R^1$ and $R^2$ independently represents hydrogen or a $C_{1-4}$ alkyl group or together represent an optionally substituted $C_{1-4}$ alkylene group, preferably an ethylene group, an optionally alkyl-substituted methylene group, an optionally $C_{1-12}$ alkyl- or phenyl-substituted 1.2-ethylene group, a 1,3-propylene group or a 1,2-cyclohexylene group.

The preparation of said polythiophene and of aqueous polythiophene-polymeric polyanion dispersions containing said polythiophene is described in published European patent application 0 440 957 and corresponding U.S. Ser. No. 647,093.

The preparation of said polythiophene proceeds in the presence of said polymeric polyanion compounds by oxidative polymerization of 3,4-dialkoxythiophenes or 3,4-alkylenedioxythiophenes according to the following general formula (II):

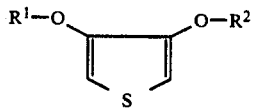

wherein:
$R^1$ and $R^2$ are as defined in general formula (I),
with oxidizing agents typically used for the oxidative polymerization of pyrrole and/or with oxygen or air in the presence of said polyacids, preferably in aqueous medium containing optionally a certain amount of organic solvents, at temperatures of 0° to 1000° C.

The polythiophenes get positive charges by the oxidative polymerization, the location and number of said charges is not determinable with certainty and therefore they are not mentioned in the general formula of the repeating units of the polythiophene polymer.

When using air or oxygen as the oxidizing agent their introduction proceeds into a solution containing thiophene, polyacid, and optionally catalytic quantities of metal salts till the polymerization is complete.

Oxidizing agents suitable for the oxidative polymerization of pyrrole are described, for example, in J. Am. Soc. 85, 454 (1963). Inexpensive and easy-to-handle oxidizing agents are preferred such as iron(III) salts, e.g. $FeCl_3$, $Fe(ClO_4)_3$ and the iron(III) salts of organic acids and inorganic acids containing organic residues, likewise $H_2O_2$, $K_2Cr_2O_7$, alkali or ammonium persulfates, alkali perborates, potassium permanganate and copper salts such as copper tetrafluoroborate.

Theoretically, 2.25 equivalents of oxidizing agent per mol of thiophene are required for the oxidative polymerization thereof [ref. J. Polym. Sci. Part A, Polymer Chemistry, Vol. 26, p.1287 (1988)]. In practice, however, the oxidizing agent is used in a certain excess, for example, in excess of 0.1 to 2 equivalents per mol of thiophene.

For the polymerization, the thiophenes corresponding to the above general formula (II) a polyacid and oxidizing agent are dissolved or emulsified in an organic solvent or preferably in water and the resulting solution or emulsion is stirred at the envisaged polymerization temperature until the polymerization reaction is completed. By that technique stable aqueous polythiophene dispersions are obtained having a solids content of 0.5 to 55% by weight and preferably of 1 to 10% by weight.

The polymerization time may be between a few minutes and 30 hours, depending on the size of the batch, the polymerization temperature and the kind of oxidizing agent. The stability of the obtained polythiophene dispersion may be improved during and/or after the polymerization by the addition of dispersing agents, e.g. anionic surface active agents such as dodecyl sulfonate, alkylaryl polyether sulfonates described in U.S. Pat. No. 3,525,621.

The size of the polymer particles in the coating dispersion is in the range of from 5 nm to 1 $\mu$m, preferably in the range of 40 to 400 nm.

Suitable polymeric polyanion compounds for use in the presence of said polythiophenes are provided by acidic polymers in free acid or neutralized form. The acidic polymers are preferably polymeric carboxylic or sulphonic acids. Examples of such polymeric acids are: polymers containing repeating units selected from the group consisting of acrylic acid, methacrylic acid, maleic acid, vinyl sulfonic acid and styrene sulfonic acid or mixtures thereof. The anionic (acidic) polymers used in conjunction with the dispersed polythiophene polymer have preferably a content of anionic groups of more than 2% by weight with respect to said polymer compounds to ensure sufficient stability of the dispersion. Suitable acidic polymers or corresponding salts are described e.g. in DE-A -25 41 230, DE-A-25 41 274, DE-A-28 35 856, EP-A-14 921, EP-A-69 671, EP-A-130 115, U.S. Pat. No. 4,147,550, U.S. Pat. No. 4,388,403 and U.S. Pat. No. 5,006,451.

The polymeric polyanion compounds may consist of straight-chain, branched chain or crosslinked polymers. Cross-linked polymeric polyanion compounds with a high amount of acidic groups are swellable in water and are named microgels. Such microgels are disclosed e.g. in U.S. Pat. No. 4,301,240, U.S. Pat. No. 4,677,050 and U.S. Pat. No. 4,147,550.

The molecular weight of the polymeric polyanion compounds being polyacids is preferably in the range from 1,000 to 2,000,000 and more preferably in the range from 2,000 to 500,000. Polyacids within the above criteria are commercially available, for example polystyrene sulfonic acids and polyacrylic acids, or may be produced by known methods (ref. e.g. Houben-Weyl, Methoden der Organischen Chemie, Vol. E20, Makromolekulare Stoffe, Teil 2. (1987). pp. 141 et seq.).

Instead of the free polymeric polyacids applied in conjunction with the polythiophenes, it is possible to use mixtures of alkali salts of said polyacids and non-neutralized polyacids, optionally in the presence of monoacids. Free acid groups of the polyanionic polymer may be allowed to react with an inorganic base, e.g.

with sodium hydroxide, to obtain a neutral polymer dispersion before coating.

The weight ratio of polythiophene polymer to polymeric polyanion compound(s) can vary widely, for example from about 50/50 to 15/85.

For improving the mechanical strength of the antistatic layer a film-forming latex, e.g. on the basis of co(-vinylidene chloride-methyl acrylate-itaconic acid), and/or a water-soluble polymeric colloid binder, e.g. polyvinyl alcohol or gelatin, may be added together with a therefor suited hardening agent.

Before coating, a surface active agent may be added to the coating composition for improving the spreading of the antistatic layer. For that purpose anionic as well as non-ionic wetting agents may be used, e.g. a $C_{12}$-$C_{18}$ alkylphenol polyethyleneoxide ether such as dodecylphenol polyethylene oxide ether, p-nonyl phenoxy polyglycidol, iso-octyl-phenylene-$(O-CH_2-CH_2$-$)_8$-$O-CH_2-COOH$ sold under the tradename AKYPO OP80 by CHEMY, the Netherlands, or saponine. It is clear that other surface-active agents may be used and that their favourable influence on reduction of surface resistivity can be checked by simple tests. A survey of surface-active agents is given e.g. in Tensid-Taschenbuch Herausgegeben von Dr. Helmut Stache - Carl Hanser Verlag München Wien (1979).

On drying the antistatic coating any solvent and water is removed by evaporation which may proceed at room temperature or at elevated temperature, e.g. in the range of 40° to 140° C.

After drying, the thickness of the antistatic layer is e.g. from 0.001 to 1 $\mu$m, depending on the desired conductivity and transparency of the antistatic coating.

For use in photographic silver halide emulsion layer film materials designated for projection purposes the optical density of the antistatic layer is preferably not more than 0.02 measured in the light range of 360 to 630 nm by MACBETH TD 904 densitometer.

Useful coverages of solids of the antistatic layer are in the range from 0.001 to 0.3 g/m$^2$.

The essential component of the barrier layer overlying the antistatic layer as defined above is a latex polymer having hydrophilic functionality as described e.g. in U.S. Pat. No. 5,006,451. Latex polymers having hydrophilic functionality and their use in photographic elements is well known in the art, for example from U.S. Pat. No. 4,689,359 issued Aug. 25, 1987.

Suitable latex polymers for use in the barrier layer used according to the present invention are copolymers of (1) one or more polymerizable monomers selected from the group consisting of styrene, vinylidene chloride, acrylonitrile, alkyl acrylates and alkyl methacrylates with (2) one or more substituted polymerizable monomers selected from the group consisting of styrenes, alkyl acrylates and alkyl methacrylates that have been substituted with a hydrophilic functional group such as an aminoalkyl salt group, an hydroxyalkyl group or carboxylic acid group.

Examples of group (I) comonomers are: ethyl acrylate, ethyl methacrylate, butyl acrylate and butyl methacrylate.

Examples of group (II) monomers are: 2-aminoethyl methacrylate hydrochloride, 2-hydroxyethyl acrylate, 2-hydroxyethyl methacrylate, N(3-aminopropyl)methacrylate hydrochloride, p-aminostyrene hydrochloride and itaconic acid.

Preferred latex polymers for use in said barrier layer are copolymers of unsaturated carboxylic acids with vinylidene chloride, acrylonitrile, (meth)acrylate monomers, styrene and mixtures thereof. Preference is given to latex polymers containing at least 50 mol % vinylidene chloride repeating units and repeating units with carboxyl functional groups, e.g. itaconic acid and acrylic acid groups.

The barrier layer composition may also comprise a monomeric coalescing material, e.g. ethylene carbonate in an amount of 5 to 30 % by weight of the latex polymer.

Particularly suited are vinylidene chloride copolymers with copolymerized unsaturated carboxylic acids as hydrophilic functionality, e.g. as described in U.S. Pat. No. 4,543,386, U.S. Pat. No. 5,006,451 and GB-P 1,234,755. Preferred copolymers of that type contain at least 50 mol % and more preferably at least 70 mol % of vinylidene chloride.

Particularly preferred latex polymers for forming said overlying barrier layer are terpolymers of vinylidene/methyl (meth)acrylate/itaconic acid containing 70 to 90 mol % vinylidene chloride, 5 to 25 mol % methyl (meth)acrylate and 1 to 10 mole % itaconic acid.

Typically the barrier layer is coated at a dry weight coverage of from about 100 to about 3,000 milligrams per m$^2$.

The coating composition of said barrier layer may contain in conjunction with the above defined latex copolymer e.g. a matting agent, coating aid and/or friction lowering substance, e.g. wax particles, colloidal silica, silicon resin or fluorinated polymer preferably in colloidal particulate form.

By the above defined antistatic layer/barrier layer assemblage it is possible to reduce the surface resistance of a resin sheet or web material to a value lower than $10^{10}$ ohm/square at relative humidity (R.H.) of 30%.

The surface resistance expressed in ohm/square (ohm/sq.) of the above defined antistatic layer is measured according to test procedure A as follows:

after coating, the resulting antistatic layer or its assemblage with overlying layer(s) is dried and conditioned at a specific relative humidity (RH) and temperature. The surface resistance expressed in ohm per square (Q/square) is performed by placing onto the outermost layer two conductive poles having a length of 10 cm parallel to each other at a distance of 1 cm and measuring the resistance built up between the electrodes with a precision ohmmeter.

According to test procedure B the resistance of the layer assemblage is measured contact-less by arranging it between capacitor plates making part of a RC-circuit differentiator network. The dimensions of the measurement cell are chosen in such a way that relying on the known capacitor value (C) it is possible to calculate from the measured RC-value the electrical resistance of the layer assemblage. Such proceeds by introducing an electrical pulse into the measurement circuit and recording the discharge curve which yields the time $\tau = R \times C$, wherein the applied charge and voltage of the electrical pulse have droppped to its 1/e value (e is the base number of the natural logarithms). Applying an alternating current voltage with frequency (f), considering the RC-circuit as a high frequency pass filter, it is possible to find the resistance by using the equation: $f = \frac{1}{2}\pi \times R \times C$ at the 3 dB point.

The discharge duration to the value 1/e of the original voltage and charge in the series resistance (R) and capacitor (C) circuit is expressed in milliseconds (msec).

The lower that value the better the antistatic character of the applied antistatic layer.

A web or sheet according to the invention can incorporate more than one antistatic layer. For example, there may be one such antistatic layer on each side of the hydrophobic resin support or resin-coated paper. In that way a particularly high resistance to attraction of dust and sparking can be achieved.

An important use of the above defined antistatic coating is in the manufacture of photographic silver halide emulsion materials having a hydrophobic resin support or hydrophobic resin coated paper support.

Hydrophobic resin supports useful in the manufacture of photographic silver halide emulsion materials are well known to those skilled in the art and are made e.g. of polyester, polystyrene, polyvinyl chloride or polycarbonate, preference being given to polyethylene terephthalate. A preferred resin coated paper support is a poly-Alpha-olefin coated paper support such as a polyethylene coated paper support.

The hydrophobic resin support may be provided with one or more subbing layers known to those skilled in the art for adhering thereto a hydrophilic colloid layer. Suitable subbing layers for polyethylene terephthalate supports are described e.g. in U.S. Pat. No. 3,397,988, 3,649,336, 4,123,278, 4,478,907, GB-P 1,234,755 and Research Disclosure published in Product Licensing Index, July 1967, p. 6.

The sheet or web material provided according to the present invention is according to a preferred embodiment a photographic silver halide emulsion layer material in which said antistatic layer is separated from one or more silver halide emulsion layers by said barrier layer.

According to a particular embodiment for counteracting the tendency to curl of said photographic material the antistatic layer is present at the support side free from silver halide emulsion layer(s) and is separated by said barrier layer from a hydrophilic colloid anti-curl layer substantially equalizing the tension exerted on the front and rear side of the photographic material after wet processing and drying. That anti-curl layer e.g. gelatin containing layer may be hardened to some extent to reduce the take up of water and to improve its abrasion resistance. Suitable hardening agents therefor are described e.g. in The Theory of the Photographic Process edited by T. H. James, 4th ed. Macmillan Publishing Co., Inc. New York, p. 77-87.

A photographic silver halide emulsion material containing according to the present invention an antistatic layer and adjacent overlying barrier layer as defined hereinbefore may contain (a) silver halide emulsion layer(s) of any type known to those skilled in the art. For example, these materials may contain a silver halide emulsion layer of the type used in continuous tone or halftone photography, microphotography and radiography. The defined antistatic layer and therewith associated barrier layer can be used advantageously in black-and-white or colour photographic materials and likewise in silver halide emulsion layers intended for use in the silver complex diffusion transfer reversal (DTR) process as well as in a dye diffusion transfer process operating with silver halide emulsion layers.

For the composition of silver halide emulsion layers reference is made e.g. to Research Disclosure 17,643 of December 1978 and Research Disclosure 307,105 of November 1989.

In a particular embodiment of the present invention a silver halide photographic material is provided wherein onto said barrier layer at the side opposite the side coated with the silver halide emulsion layer(s) an antihalation layer containing one or more pigments in admixture with a hydrophilic colloid binder, e.g. gelatin, is applied. The antireflection substance used in the antihalation coating, e.g. carbon black, may itself have antistatic properties.

Apart from its use in photographic silver halide emulsion materials the antistatic layer/barrier layer assemblage may be used in non-photosensitive recording materials serving as image-receiving material in the silver complex diffusion transfer process as described e.g. in the book "Photographic Silver Halide Diffusion Processes" by Andr/ Rott and Edith Weyde—The Focal Press London and New York (1972) or in a dye diffusion transfer process as described e.g. by C. Van de Sande in Angew. Chem. Int. Ed. Engl. 22, (1983) p. 191–209.

By using a photographic silver halide emulsion layer material having an antistatic layer/barrier layer assemblage as defined above, problems caused by static charges can be avoided or substantially reduced. For example, the formation of static charges by contact of a silver halide emulsion layer face with the rear side of the recording material or caused by friction with substances such as rubber and hydrophobic polymeric binder, e.g. the binder constituent of phosphor screens used as X-ray intensifying screens, can be markedly reduced by employing the antistatic layer/covering layer assemblage in accordance with the present invention. The build up of static charges and subsequent dust attraction and/or sparking, e.g. during loading of films in cassettes, e.g. X-ray cassettes, or transport in cameras, e.g. micro-film cameras, and projectors, can be avoided.

Although the above defined antistatic layer/barrier layer assemblage is particularly useful in reducing the surface resistance of photographic silver halide emulsion materials it is likewise useful in reducing surface resistance of photographic materials based on diazotype compositions, vesicular-image forming materials, magnetic recording materials, electrographic or electrophotographic recording materials and mounting or drafting film.

The examples hereinafter set forth are directed to the use of said layer assemblage on a subbed polyethylene terephthalate resin support but other resin bases, e.g. made of polystyrene, polyvinyl chloride or polyethylene either or not being corona-discharge treated and/or subbed with (a) subbing layer(s) for improving the adherence of hydrophilic colloid layers will obtain a strong reduction in surface resistance when coated with the herein described antistatic layer/barrier layer assemblage.

The following examples illustrate the present invention without however limiting it thereto.

All percentages, parts and ratios are by weight unless otherwise mentioned.

EXAMPLE 1

(I) Preparation of 3,4-ethylenedioxy-thiophene

The 3,4-disubstituted thiophenes of the formula (II) can be obtained by processes known in principle by reacting the alkali metal salts of 3,4-dihydroxy-thiophene-2,5-dicarboxylic esters with the appropriate alkylene vic-dihalides and subsequently decarboxylating the free 3,4-(alkylene-vic-dioxy)thiophene-2,5-dicarboxylic acids (see, for example, Tetrahedron 1967 Vol. 23, 2437-2441 and J. Am. Chem. Soc. 67 (1945) 2217-2218).

(II) Preparation of poly(3,4-ethylenedioxy-thiophene) dispersion

Into 1000 ml of an aqueous solution of 20 g of polystyrene sulfonic acid (109 mmol of $SO_3H$ groups) with number-average molecular weight (Mn) 40,000, were introduced 3.6 g of potassium peroxidisulfate and 5.6 g of 3,4-ethylenedioxy-thiophene. The thus obtained reaction mixture was stirred for 24 h at 20° C. and a dispersion with solids content of about 2.5% was obtained.

(III) Preparation of the antistatic layer

A longitudinally stretched polyethylene terephthalate support having a thickness of 0.1 mm was subbed with a terpolymer latex of vinylidene chloride/methyl acrylate/itaconic acid (88/10/2) and colloidal silica (surface area 100 $m^2/g$). After stretching in the transverse direction the coverages of said terpolymer and of said silica in said subbing layer were 170 $mg/m^2$ and 40 $mg/m^2$ respectively.

Onto said subbing layer an antistatic layer was applied from a mixture of 140 ml of the above prepared poly(3,4-ethylenedioxythiophene) dispersion, 858 ml of water and 2 ml of a 5% solution in water of wetting agent AKYPO OP 80 (tradename).

The coating proceeded at a wet coverage of 50 $m^2/l$ resulting after drying at 115° C. in a dry solids coverage of 70 $mg/m^2$.

A transparent practically colourless antistatic layer was obtained.

Onto said antistatic layer a barrier layer was coated at a solids coverage of 0.5 $g/m^2$ from an aqueous dispersion (latex) of a terpolymer of vinylidene/methyl methacrylate/itaconic acid (88/10/2). At the barrier layer side the surface resistance was measured according to test procedure A as defined herein at 30% and 60% relative humidity (RH) conditions and temperature of 21° C. The measurements were carried out before (BP) and after (AP) a wet processing common for developing and fixing exposed photographic silver halide emulsion materials using an alkaline developer (pH=11), an acidic thiosulphate fixing liquid (pH=4.5), and tap water as rinsing liquid. The results expressed in ohm/-square are listed in the following Table 1.

The RC value equal to discharging time τ (expressed in msec.) being a measure for the mobility of electrical charges in the applied coating assemblage was determined according to test procedure B as described herein at 30% RH and 21° C. such before (BP) and after (AP) wet processing. The results are listed also in Table 1.

TABLE 1

| RH / °C. | BP | AP |
|---|---|---|
| Surface resistance (Q/square) | | |
| 30% / 21 | <0.1 × 10^8 | 0.2 × 10^8 |
| 60% / 21 | <0.1 × 10^8 | 0.2 × 10^8 |
| Discharging time τ = RC (msec.) | | |
| 30% / 21 | <0.006 | <0.006 |

The results in Table 1 prove that the resistance of the applied layer assemblage is almost the same before and after wet processing, whereby the thus coated material has a so-called permanent antistatic character.

The adherence of the barrier layer to the underlying antistatic layer was tested in dry state and after prewetting by immersion for 10 minutes in water of 38° C.

On carrying out the adherence test in dry state, a pressure-adhesive tape was pressed by finger-force onto a non-wetted material and thereupon teared off abruptly.

On carrying out the adherence test in wet state the prewetted material was strongly rubbed 5 times with a sponge.

In neither of the above defined adherence tests a part of the layer assemblage was removed, thereby proving the very good adherence of the antistatic layer to its subbing layer and its firmly bonding to the overlying barrier layer.

EXAMPLE 2

Example 1 was repeated with the difference however that onto said barrier layer a gelatin-containing layer supressing the tendency to curl of photographic gelatin-silver halide emulsion layer materials was coated. The coating of the anticurl layer proceeded in such a way that gelatin and colloidal silica (surface area 300 $m^2/g$) were present at a dry coverage of 2.5 $g/m^2$ and 1.2 $g/m^2$ respectively. Before coating to the aqueous coating as hardening agent for gelatin 20 ml/l of an aqueous coating solution (4.8 g/100 ml) of dimethylol urea having a concentration of 4.8 g/100 ml were added. As wetting agent 10 ml/l of ULTRAVON W (trade name for the disodium salt of 2-heptadecylbenzimidazole disulphonic acid sold by CIBA A.G. Switserland) was added.

As in Example 1 the surface resistance and charge mobility were measured. The results are listed in the following Table 2.

The optical density of the layer assemblage (1) containing said antistatic layer and said barrier layer and of the layer assemblage (2) containing the assemblage (1) in conjunction with said anticurl layer measured with Macbeth TD 904 densitometer are mentioned also in said Table 2. The optical density measurements proceeded before processing (BP) in the UV (at 370 nm) and wavelength range (350-630 nm).

TABLE 2

| RH / °C. | BP | AP |
|---|---|---|
| Surface resistance (Q/square) | | |
| 30% / 21 | 5.8 × 10^8 | 0.4 × 10^8 |
| 60% / 21 | 1.3 × 10^8 | 4.0 × 10^8 |
| Discharging time τ = RC (msec.) | | |
| 30% / 21 | <0.006 | <0.006 |
| Optical density (BP) measured in transmission | | |
| Layer assemblage | 370 nm | 350-630 nm |
| (1) | 0.014 | 0.019 |
| (2) | 0.018 | 0.019 |

COMPARATIVE EXAMPLE 1

Example 2 was repeated with the difference however that the described barrier layer was omitted and the gelatin-containing layer supressing the tendency to curl was coated directly onto the antistatic layer.

As in Example 1 the resistance applying test procedures A and B, and the adherence were measured. The surface resistance and RC-time results are listed in the following Table 3.

TABLE 3

| RH / °C. | BP | AP |
|---|---|---|
| | Surface resistance (Ω/square) | |
| 30% / 21 | $30 \times 10^8$ | $240 \times 10^8$ |
| 60% / 21 | $50 \times 10^8$ | $180 \times 10^8$ |
| | Discharging time $\tau$ = RC (msec.) | |
| 30% / 21 | 0.2 | 2.0 |

The results of the adherence test carried out as described in Example 1 proved that the adherence of the antistatic layer barrier layer in dry state was satisfactory but insufficient after the applied pre-wetting test procedure.

COMPARATIVE EXAMPLE 2

(1) Preparation of the poly(3,4-ethylenedioxy-thiophene) dispersion

Into 1000 ml of an aqueous solution of 20 g of polystyrene sulfonic acid (109 mmol of $SO_3H$ groups) with number-average molecular weight 40,000, were introduced 5.4 g of potassium peroxidisulfate and 5.6 g of 3,4-ethylenedioxy-thiophene. The thus obtained reaction mixture was stirred for 24 h at 20° C. and a dispersion with solids content of about 2.4 % was obtained.

(2) Preparation of the antistatic layer

A subbed polyethylene terephthalate support as described in Example 1 was coated with an antistatic layer from the above prepared poly(3,4-ethylenedioxy-thiophene) dispersion (1) of which 88 ml were used in admixture with 912 ml of water. The coating proceeded at a wet coverage of 60 m²/l and the coated layer was dried at 120° C. A transparent and practically colourless antistatic layer was obtained.

The surface resistance was measured before processing (BP) at 21° C. in relative humidity circumstances of 30%.

Having no protective barrier layer the antistatic layer is easily damaged in the conventionally used roller-transport processing units for automatic processing of photographic silver halide emulsion layer materials.

The surface resistance result without barrier layer is presented in the following Table 4.

TABLE 4

| RH / °C. | Surface resistance (Ω/square) BP |
|---|---|
| 30% / 21 | $5 \times 10^6$ |

EXAMPLES 3 to 5

Comparative Example 2 was repeated with the difference however that onto said antistatic layer first a barrier layer was coated having in addition to the composition of Example 1 10% by weight of ethylene carbonate calculated on its latex polymer content. Onto said barrier layer an anticurl layer as defined in Example 2 was coated. The coverages of solids of the barrier layers in the Examples 3 to 5 were 1, 1.8 and 2.6 g/m² respectively.

As in Example 1 the surface resistance and discharging time were measured at 30% relative humidity and 21° C. before (BP) and after (AP) wet processing as applied in silver halide photography. The results are presented in the following Table 5. As in Example 2, the optical density of the layer assemblage including the anticurl layer was determined.

TABLE 5

| | BP | AP |
|---|---|---|
| | Surface resistance (Ω/square) 30% RH/21° C. | |
| Example 3 | $1.8 \times 10^9$ | $4.3 \times 10^9$ |
| Example 4 | $3.1 \times 10^9$ | $4.6 \times 10^9$ |
| Example 5 | $7.6 \times 10^{11}$ | $4.5 \times 10^{11}$ |
| | Discharging time $\tau$ = (msec.) | |
| Example 3 | 0.018 | 0.12 |
| Example 4 | <0.006 | <0.006 |
| Example 5 | <0.006 | <0.006 |
| | Optical density (BP) | |
| Example | 370 nm | 350–630 nm |
| 3 | 0.002 | 0.000 |
| 4 | 0.000 | 0.000 |
| 5 | 0.000 | 0.000 |

EXAMPLE 6

Onto the barrier layer of the Example 1 material a gelatin-silver bromide-iodide emulsion [AgBr/AgI (99/1 mole %] was coated at a coverage of silver halide equivalent with 2.06 g of silver nitrate per m2. The gelatin to silver halide ratio was 1.5, the silver halide being expressed as an equivalent amount of silver nitrate. The average grain size of the silver halide was 0.35 μm.

The antistatic properties of the thus obtained photographic material were fully satisfactory from the viewpoint of the absence of dust attraction on friction before and after wet processing.

We claim:

1. A sheet or web material comprising a hydrophobic resin support or a paper support coated with at least one hydrophobic resin layer wherein said resin support or resin layer is coated with an antistatic layer applied from a polymer dispersion containing a polythiophene with conjugated polymer backbone and a polymeric polyanion compound, with the size of the polymer particles in said dispersion being from 5 nm to 1 μm, and wherein said antistatic layer is coated with an overlying adhering barrier layer applied from an aqueous polymer dispersion wherein the polymer of said barrier layer has hydrophilic functionality and said overlying adhering barrier layer is adhered to a hydrophilic colloid-containing layer.

2. The sheet or web material according to claim 1 wherein said hydrophilic colloid-containing layer is a gelatin-silver halide emulsion layer.

3. The sheet or web material according to claim 1 wherein said polythiophene is made up of structural units corresponding to the following general formula (I):

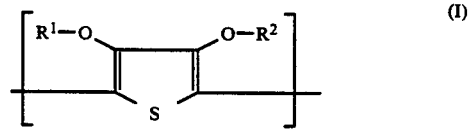

in which:
each of $R^1$ and $R^2$ independently represents hydrogen or a $C_{1-4}$ alkyl group or together represent a $C_{1-4}$ alkylene group.

4. The sheet or web material according to claim 1 wherein said polythiophene has been prepared in the presence of said polymeric polyanion compound by oxidative polymerization of 3,4-dialkoxythiophenes or 3,4-alkylenedioxythiophenes according to the following general formula (II):

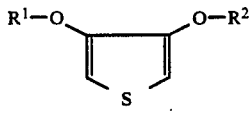

in which:
R$^1$ and R$^2$ independently represent hydrogen or a C$_{1-4}$ alkyl group or together represent a C$_{1-4}$ alkylene group.

5. The sheet or web material according to claim 1 wherein said polymeric polyanion compound is a polymeric carboxylic acid or polymeric sulfonic acid or such acid in salt form.

6. The sheet or web material according to claim 5 wherein said polymeric polyanion compound is a polymer comprising styrene sulfonic acid units.

7. The sheet or web material according to claim 1 wherein said polymer in the barrier layer is a copolymer of (1) one or more polymerizable monomers selected from the group consisting of styrene, vinylidene chloride, acrylonitrile, alkyl acrylates and alkyl methacrylate with (2) one or more substituted polymerizable co-monomers selected from the group consisting of styrenes, alkyl acryaltes and alkyl methacrylates each of which have been substituted with an aminoalkyl salt group, an hydroxyalkyl group, or a carboxylic acid group.

8. The sheet or web material according to claim 1 wherein the group (1) monomers are selected from the group consisting of ethyl acrylate, ethyl methacryalte, butyl acrylate and butyl methacrylate, and the group (2) monomers are selected from the group consisting of 2-aminoethyl methacrylate hydrochloride, 2-hydroxyethyl acrylate, 2-hydroxyethyl methacrylate, N(3-aminopropyl)methacrylate hydrochloride, p-aminostyrene hydrochloride acrylic acid, and itaconic acid.

9. The sheet or web material according to claim 7 wherein the polymer present in said barrier layer is a copolymer containing at least 50 mol % vinylidene chloride repeating units and repeating units with a carboxyl functional group.

10. The sheet or web material according to claim 1 wherein said material is a photographic material containing at one side of said support at least one silver halide emulsion layer and at the side free from said at least one silver halide emulsion layer, in sequence, said antistatic layer, said barrier layer and a hydrophilic colloid anti-curl layer.

* * * * *